United States Patent
Sanchez et al.

(10) Patent No.: US 8,778,169 B2
(45) Date of Patent: *Jul. 15, 2014

(54) RESIDUE CONVERSION PROCESS THAT INCLUDES A DEASPHALTING STAGE AND A HYDROCONVERSION STAGE

(75) Inventors: Eric Sanchez, Saint Genis Laval (FR); Jan Verstraete, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 190 days.

This patent is subject to a terminal disclaimer.

(21) Appl. No.: 13/226,626

(22) Filed: Sep. 7, 2011

(65) Prior Publication Data

US 2012/0061293 A1 Mar. 15, 2012

(30) Foreign Application Priority Data

Sep. 7, 2010 (FR) ..................................... 10 03560

(51) Int. Cl.
| | | |
|---|---|---|
| C10G 67/00 | (2006.01) | |
| C10G 67/02 | (2006.01) | |
| C10G 67/04 | (2006.01) | |
| C10G 47/00 | (2006.01) | |
| C10G 49/10 | (2006.01) | |

(52) U.S. Cl.
USPC ................. 208/58; 208/49; 208/95; 208/108; 208/209

(58) Field of Classification Search
USPC ........... 208/46, 49, 58, 95, 96, 106, 107, 108, 208/111.35, 208 R, 209, 251 R, 251 H, 254 R, 208/254 H
See application file for complete search history.

(56) References Cited

U.S. PATENT DOCUMENTS

| | | | |
|---|---|---|---|
| 4,591,426 A | 5/1986 | Krasuk et al. | |
| 5,980,730 A | 11/1999 | Morel et al. | |
| 6,017,441 A | 1/2000 | Morel et al. | |
| 7,618,530 B2 * | 11/2009 | Satchell, Jr. | .................. 208/113 |

FOREIGN PATENT DOCUMENTS

| | | |
|---|---|---|
| FR | 2 753 982 A1 | 4/1998 |
| FR | 2 753 984 A1 | 4/1998 |

OTHER PUBLICATIONS

Perry's Chemical Engineer's Handbook, 2007, McGraw-Hill, 8th Ed., pp. 13-5-13-6.*
Parkash, S, Refining Processes Handbook, 2003, Gulf Publishing, p. 29-61.*
Search Report of FR1003560 (Mar. 28, 2011).

* cited by examiner

*Primary Examiner* — Walter D Griffin
*Assistant Examiner* — Derek Mueller
(74) *Attorney, Agent, or Firm* — Millen, White, Zelano & Branigan, P.C.

(57) ABSTRACT

Conversion of a heavy hydrocarbon fraction that is obtained either from a crude oil or from the distillation of a crude oil and that has an initial boiling point of at least 300° C. by hydroconversion of at least one portion of heavy hydrocarbon fraction in the presence of hydrogen in at least one three-phase reactor containing at least one hydroconversion catalyst, separation of the effluent to obtain a light liquid fraction that boils at a temperature that is less than 300° C. and a heavy liquid fraction that boils at a temperature that is greater than 300° C., and a deasphalting of at least one portion of the heavy liquid fraction that boils at a temperature that is greater than 300° C.

10 Claims, 1 Drawing Sheet

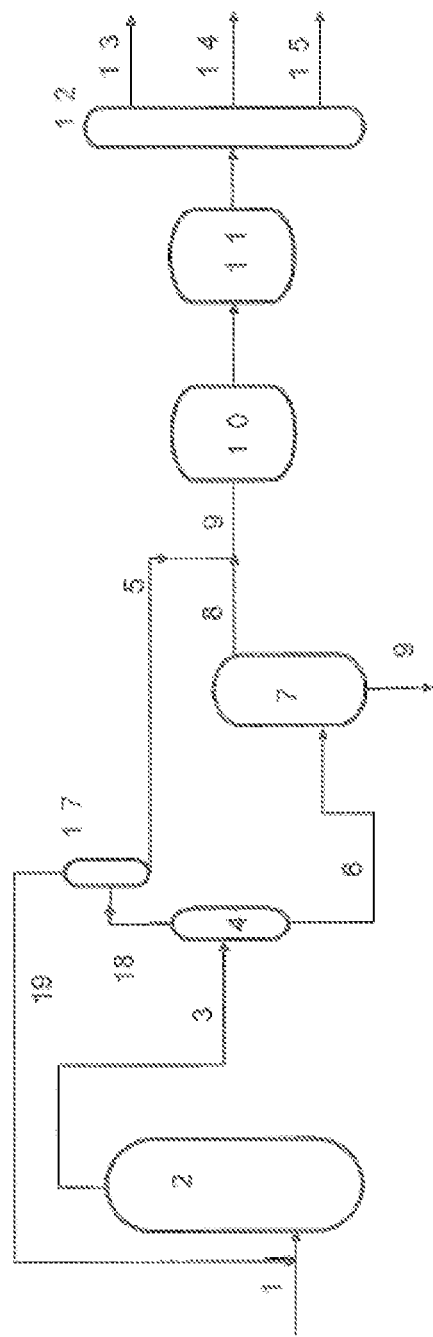

RESIDUE CONVERSION PROCESS THAT INCLUDES A DEASPHALTING STAGE AND A HYDROCONVERSION STAGE

The invention relates to the refining and conversion of heavy hydrocarbon fractions obtained from atmospheric or vacuum distillation of a crude oil either of crude oil type or of the residue type having an initial boiling point of at least 300° C. and containing, i.a., sulfur-containing and nitrogen-containing impurities. It relates more particularly to a process that makes it possible to convert—at least partially—a hydrocarbon feedstock, such as, for example, a vacuum residue that is obtained by atmospheric distillation followed by a vacuum distillation of a crude oil.

The upgrading of these petroleum residues is relatively difficult. Actually, the market is primarily a demander of fuels, distillable at atmospheric pressure at a temperature that is less than 320-380° C. The crude oils are characterized by variable contents of atmospheric residues that depend on the origin of the treated crudes. This content generally varies between 20 and 50% for the conventional crudes, but it can reach 50 to 80% for the heavy and extra-heavy crudes, such as, for example, those produced in Venezuela or in the Athabasca region in northern Canada. It is therefore necessary to convert these residues by breaking the heavy molecules of residues for producing smaller molecules by cracking.

More specifically, the feedstocks that are treated within the framework of this invention are either crude oils or heavy hydrocarbon fractions that are obtained from the distillation of a crude oil and that have an initial boiling point of at least 300° C., preferably at least 360° C., and in a preferred manner at least 370° C., and preferably vacuum residues. These feedstocks are generally hydrocarbon fractions that have a sulfur content of at least 0.5%, preferably at least 1%, and in a preferred manner at least 2% by weight, a content of Conradson carbon of at least 5% by weight, and preferably at least 10% by weight, a content of C7 asphaltenes of at least 1% by weight, and preferably at least 5% by weight, and a content of metals of at least 20 ppm, and preferably at least 100 ppm.

One of the objectives of the invention is to provide a conversion process that includes stages of hydroconversion and deasphalting within the same reaction section, thus enhancing the thermal integration by optimizing the network of exchangers and reducing both the initial investment of the concatenation by reducing the number of pieces of equipment that are necessary as well as the operating expenses.

Another objective of the invention is to provide a conversion process that includes hydroconversion and deasphalting stages within the same reaction section, thus making it possible to obtain a deasphalted oil (DAO) of good quality, i.e., having a reduced content of nitrogen and metals.

STATE OF THE ART

In general, the schemes for conversion of conventional residues of the prior art comprise a deasphalting (SDA), followed by a boiling bed hydroconversion stage as in the patent application WO-04/74408. The state of the art shows that these two known processes are successively implemented in series. Actually, in the residue conversion schemes combining an SDA unit with a fixed bed or boiling bed hydroconversion unit, as appropriate, the SDA unit can be placed upstream along the indirect path or downstream from the hydroconversion process along the direct path. The patents FR 2776297 and U.S. Pat. No. 7,214,308 describe these two possible conversion scheme types.

More specifically, a residue conversion scheme generally combines two successive unit stages: a hydroconversion stage and a deasphalting stage, an intermediate atmospheric distillation stage, and optionally an intermediate vacuum distillation stage being implemented between these two unit stages. Actually, the residue can be treated at least partially in a hydroconversion section in the presence of hydrogen, with said section comprising at least one three-phase reactor that contains a boiling bed hydroconversion catalyst that operates with an upward flow of liquid and gas. This or these reactors comprise at least one means for drawing off catalyst and at least one fresh catalyst make-up means. The conditions that are applied in the hydroconversion reaction section make it possible to obtain a liquid effluent with a reduced content of Conradson carbon, metals and sulfur. The hydroconverted liquid effluent is next sent into an atmospheric distillation zone and intermediate vacuum distillation zone following which atmospheric distillate fractions, a vacuum distillate fraction, and a vacuum residue fraction are recovered.

The vacuum residue that is obtained from the distillation zone is next advantageously sent into a deasphalting section in which it is treated in an extractor using a solvent under deasphalting conditions that are known to one skilled in the art, making it possible to obtain a deasphalted hydrocarbon fraction, called DAO, and residual asphalt.

The deasphalting operation (SDA) with solvent is advantageously implemented under conditions that are well known to one skilled in the art: it thus is possible to refer to the article by Billon and others published in 1994 in Volume 49, No. 5 of the journal of the French Petroleum Institute, pages 495 to 507, in the book "Raffinage et conversion des produits lourds du pétrole [Refining and Conversion of Heavy Petroleum Products]" by J. F. Le Page, S. G. Chatila, and M. Davidson, Edition Technip, pages 17-32, or in the U.S. Pat. No. 4,715, 946. The deasphalting can advantageously be done in a mixer-decanter or in an extraction column. The solvent that is used for the deasphalting preferably is a paraffinic solvent and in a preferred manner is heavier than propane. The preferred solvents comprise propane-butane mixtures, butane, pentane, hexane, heptane, light gasoline as well as the mixtures that are obtained from the above-mentioned solvents. The solvent is advantageously recovered by evaporation or distillation or by the opticritical process, i.e., under supercritical conditions.

The deasphalted hydrocarbon fraction (DAO) that is thus obtained and, after mixing with at least one portion of the vacuum distillate, called VGO, obtained from the distillation zone, next undergoes a post-treatment under conditions that make it possible to reduce in particular its content of metals, sulfur, nitrogen and Conradson carbon and to obtain—after a new separation by distillation—a gaseous fraction, an atmospheric distillate that it is possible to split into a gasoline and diesel fuel fraction that is next sent to the fuel pool and a heavier hydrotreated fraction, this heavier fraction then being able to be sent into a catalytic cracking or catalytic hydrocracking section, for example.

This invention proposes enhancing this concatenation comprising two unit processes for hydroconversion and deasphalting, separated by an atmospheric and intermediate vacuum distillation stage, by proposing a new process that includes said hydroconversion stages using the boiling bed and deasphalting technology using the liquid-liquid extraction technology, within the same unit reaction section, without an atmospheric and intermediate vacuum distillation stage. This advanced scheme makes it possible in particular to enhance the overall liquid yield by reduction of the asphalt fraction as well as to reduce the initial investment and the operating cost of the process, in terms of consumption of fluxing agent. It further makes it possible to enhance the quality of the products that are obtained, more particularly in terms of nitrogen and metals of the hydrotreated heavy fraction.

SUMMARY OF THE INVENTION

This invention describes a process for conversion of crude oil or of the heavy hydrocarbon fraction that is obtained from atmospheric or vacuum distillation of a crude oil and that has an initial boiling point of at least 300° C. in which said process comprises the following stages:
- a) Hydroconversion of at least one portion of said feedstock in the presence of hydrogen in at least one three-phase reactor, whereby said reactor contains at least one hydroconversion catalyst and operates in a boiling bed, with an upward flow of liquid and gas and that comprises at least one means for drawing off said catalyst outside of said reactor and at least one fresh catalyst make-up means in said reactor, under conditions that make it possible to obtain a liquid feedstock with a reduced content of Conradson carbon, metals, sulfur and nitrogen,
- b) Separation of the effluent that is obtained from stage a) for obtaining a light liquid fraction that boils at a temperature that is less than 300° C. and a heavy liquid fraction that boils at a temperature that is greater than 300° C.,
- c) Deasphalting of at least one portion of the heavy liquid fraction that boils at a temperature that is greater than 300° C. that is obtained from stage b) for obtaining a deasphalted hydrocarbon fraction and residual asphalt.

This new scheme is differentiated from the conventional concatenation scheme mentioned above by the fact that the effluent of the boiling bed hydroconversion reaction section is directly treated in a deasphalting unit after a simple separation of the light fraction that boils at a temperature that is less than 300° C., whereby the heavy liquid effluent that boils at a temperature that is greater than 300° C. is brought into contact with a solvent under conditions that make it possible to obtain a deasphalted hydrocarbon fraction and residual asphalt.

This invention therefore has the objective of providing a heavy hydrocarbon conversion process for the production of gasoline fractions and middle distillates with a simpler and more economical process, with improved yields while maintaining good qualities of products and a reduced use of fluxing agent that is necessary to the transport of the asphalt phase.

DETAILED DESCRIPTION OF THE INVENTION

According to stage a) of the process according to the invention, the feedstock that consists of a crude oil or the fraction that is obtained from atmospheric or vacuum distillation of a crude oil undergoes a hydroconversion stage a) of at least one portion of said feedstock in the presence of hydrogen in at least one three-phase reactor, whereby said reactor contains at least one hydroconversion catalyst and operates in a boiling bed, with an upward flow of liquid and gas and comprising at least one means for drawing off said catalyst outside of said reactor and at least one fresh catalyst make-up means in said reactor, under conditions that make it possible to obtain a liquid feedstock with a reduced content of Conradson carbon, metals, sulfur and nitrogen.

The feedstocks that are treated within the framework of this invention consist of hydrocarbon fractions that are obtained from a crude oil or from the atmospheric or vacuum distillation of a crude oil, with said feedstocks having a boiling point of at least 300° C., preferably at least 360° C., and in a preferred manner at least 370° C., and preferably vacuum residues. These feedstocks are generally hydrocarbon fractions that preferably have a sulfur content of at least 0.5%, preferably at least 1%, and in a preferred manner at least 2% by weight, a content of Conradson carbon of at least 5% by weight and preferably at least 10% by weight, a content of C7 asphaltenes of at least 1% by weight and preferably at least 5% by weight, and a content of metals of at least 20 ppm and preferably at least 100 ppm.

The stage a) for hydroconversion of said feedstock is generally implemented under conventional boiling bed hydroconversion conditions of a liquid hydrocarbon fraction. The procedure is usually performed under an absolute pressure of between 2 and 35 MPa, preferably between 5 and 25 MPa, and in a preferred manner between 6 and 20 MPa, at a temperature that is between 300 and 550° C. and preferably between 350 and 500° C. The hourly volumetric flow rate (VVH) and the partial hydrogen pressure are important factors that are selected based on the characteristics of the product to be treated and the desired conversion. Preferably, the VVH is between $0.1\ h^{-1}$ and $10\ h^{-1}$ and in a preferred manner between $0.15\ h^{-1}$ and $5\ h^{-1}$. The amount of hydrogen mixed with the feedstock is preferably between 50 and 5,000 normal cubic meters ($Nm^3$) per cubic meter ($m^3$) of liquid feedstock, and in a preferred manner between 100 and 2,000 $Nm^3/m^3$, and in a very preferred manner between 200 and 1,000 $Nm^3/m^3$.

The hydroconversion catalyst used in stage a) of the process according to the invention is advantageously a catalyst that comprises a substrate, preferably amorphous and in a very preferred manner alumina, and at least one metal of group VIII that is selected from among nickel and cobalt and preferably nickel, whereby said element of group VIII is preferably used in combination with at least one metal of group VIB that is selected from among molybdenum and tungsten, and preferably the metal of group VIB is molybdenum.

Preferably, the hydroconversion catalyst comprises nickel as an element of group VIII and molybdenum as an element of group VIB. The nickel content is advantageously between 0.5 and 10%, expressed in terms of weight of nickel oxide (NiO), and preferably between 1 to 6% by weight, and the molybdenum content is advantageously between 1 and 30%, expressed in terms of weight of molybdenum trioxide ($MoO_3$), and preferably between 4 and 20% by weight. This catalyst is advantageously in the form of cylindrical or trilobar extrudates or balls.

In accordance with the process according to the invention, the used hydroconversion catalyst can be partially replaced by fresh catalyst by drawing off, preferably at the bottom of the reactor and by introduction, either at the top or at the bottom of the reactor, fresh or regenerated or rejuvenated catalyst, preferably at a regular time interval and in a preferred manner in bursts or in an almost continuous way. The rate of replacement of the used hydroconversion catalyst by fresh catalyst is advantageously between 0.05 kilogram and 10 kilograms per cubic meter of treated feedstock, and preferably between 0.3 kilogram and 3 kilograms per cubic meter of treated feedstock. This drawing-off and this replacement are carried out using devices that advantageously make possible the continuous operation of this hydroconversion stage.

It is also advantageously possible to send the used catalyst that is drawn off from the reactor into a regeneration zone in which the carbon and the sulfur that it contains are eliminated and then to send this regenerated catalyst back into the hydroconversion stage a). It is also advantageously possible to send the used catalyst that is drawn off from the reactor into a rejuvenation zone in which the majority of the deposited metals are eliminated before the used and rejuvenated catalyst is sent into a regeneration zone in which the carbon and the sulfur that it contains are eliminated and then to send this regenerated catalyst back into the hydroconversion stage a).

The stage a) of the process according to the invention is advantageously implemented under the conditions of the H-OIL process as described in, for example, the U.S. Pat. No. 4,521,295 or U.S. Pat. No. 4,495,060 or U.S. Pat. No. 4,457,831 or U.S. Pat. No. 4,354,852 or in the article Aiche, Mar. 19-23, 1995, HOUSTON, Tex., paper number 46d, Second Generation Ebullated Bed Technology.

The hydroconversion catalyst that is used in the hydroconversion stage a) advantageously makes it possible to ensure both the demetallization and the desulfurization, under conditions that make it possible to obtain a liquid feedstock with a reduced content of metals, Conradson carbon and sulfur and that make it possible to obtain a strong conversion into light products, i.e., in particular into fuel fractions of gasoline and diesel fuel.

Stage a) is advantageously implemented in one or more three-phase hydroconversion reactors. Each reactor advantageously comprises a recirculation pump that makes it possible to maintain the catalyst in a boiling bed by continuous recycling of at least one portion of a liquid fraction that is advantageously drawn off at the top of the reactor and reinjected at the bottom of the reactor.

The effluent that is obtained from the hydroconversion stage a) next undergoes—in accordance with stage b) of the process according to the invention—a separation stage for obtaining a light liquid fraction that boils at a temperature that is less than 300° C., preferably less than 350° C., and in a preferred manner less than 375° C., and a heavy liquid fraction that boils at a temperature that is greater than 300° C., preferably greater than 350° C., and in a preferred manner greater than 375° C. This separation comprises any means of separation that is known by one skilled in the art, excluding atmospheric and vacuum distillations. Preferably, said separation stage b) is not an atmospheric and vacuum distillation. Preferably, this separation is implemented by one or more flash tanks in a series, and in a preferred manner by a concatenation of two successive flash tanks.

In the separation stage b), the conditions are selected in such a way that the fraction point is 300° C., preferably 350° C., and in a preferred manner 375° C., so as to obtain two liquid fractions, a so-called light fraction advantageously separated from light gases ($H_2$ and $C_1$-$C_4$), and a so-called heavy fraction.

The light fraction that is directly obtained at the output of the separation stage c) is advantageously separated from light gases ($H_2$ and $C_1$-$C_4$) for obtaining said light liquid fraction that boils at a temperature that is less than 300° C., by any separation means known to one skilled in the art, such as, for example, by being run into a flash tank in such a way as to recover the gaseous hydrogen that is advantageously recycled in the hydroconversion stage a).

The light liquid fraction, advantageously separated from said light gases and that boils at a temperature that is less than 300° C., preferably less than 350° C., and in a preferred manner less than 375° C., contains the dissolved light gases (C5+), a fraction that boils at a temperature that is less than 150° C. corresponding to naphthas, a fraction that boils between 150 and 250° C. corresponding to the kerosene fraction, and at least one portion of the diesel fuel fraction that boils between 250 and 375° C.

According to one embodiment, at least one portion of the light liquid fraction thus obtained and preferably all of it is advantageously sent into post-treatment units, such as, for example, a hydrotreatment and/or hydrocracking unit, for the purpose of incorporating it in the corresponding fuel pools.

The heavy liquid fraction that boils at a temperature that is greater than 300° C., preferably greater than 350° C., and in a preferred manner greater than 375° C., contains at least one portion of the diesel fuel fraction that boils between 250 and 375° C., a fraction that boils between 375 and 524° C., called a vacuum distillate, and a fraction that boils at a temperature that is greater than 524° C., and preferably greater than 530° C., called an unconverted vacuum residue. The heavy liquid fraction therefore advantageously comprises at least one portion of middle distillates and preferably at least one portion of the diesel fuel fraction that boils at a temperature that is between 250 and 375° C.

In accordance with the process according to the invention, the heavy liquid fraction that boils at a temperature that is greater than 300° C., preferably greater than 350° C., and in a preferred manner greater than 375° C., next undergoes a deasphalting stage c), without an atmospheric and preliminary intermediate vacuum distillation stage, for obtaining a deasphalted hydrocarbon fraction, called DAO, and residual asphalt.

The deasphalting stage using a solvent is carried out under conditions that are well known to one skilled in the art.

The deasphalting is generally implemented at a mean temperature that is between 60 and 250° C. with at least one hydrocarbon solvent that has 3 to 7 carbon atoms; the solvent is preferably butane, pentane or hexane, as well as their mixtures, optionally supplemented with at least one additive. The usable solvents and the additives are extensively described. It is also possible and advantageous to implement the recovery of the solvent according to the opticritical process, i.e., by using a solvent under non-supercritical conditions in the separation section. This process makes it possible in particular to significantly enhance the overall economy of the process. This deasphalting can be done in one or more mixer-decanters or in one or more extraction columns.

Within the framework of this invention, the technique (for example, the Solvahl process) using at least one extraction column—and preferably only one—is preferred. Advantageously, as in the Solvahl process with a single extraction column, the solvent/feedstock ratios entering the deasphalting unit are small, between 4/1 and 6/1. The deasphalting unit produces a deasphalted hydrocarbon fraction DAO that is virtually free of C7 asphaltenes and a residual asphalt that concentrates the majority of the impurities of the residue, which is drawn off. The DAO yield can vary by less than 40% by weight to more than 90% by weight according to the operating conditions and the solvent that is used. The following table provides the ranges of typical operating conditions for the deasphalting based on the solvent:

|  | Solvent | | | | |
| --- | --- | --- | --- | --- | --- |
|  | Propane | Butane | Pentane | Hexane | Heptane |
| Pressure, MPa | 3-4 | 3-4 | 2-4 | 2-4 | 2-4 |
| Temperature, ° C. | 45-90 | 80-130 | 140-210 | 150-230 | 160-250 |
| Solvent/Feedstock Ratio, v/v | 6-10 | 5-8 | 3-6 | 3-6 | 3-5 |

The deasphalted hydrocarbon fraction DAO that is obtained advantageously has a C7 asphaltene content that is less than 1% in general (the measurement of the C7 asphaltene content is taken according to the Standard NFT60-115), preferably less than 0.5%, in a preferred manner less than 0.05% by weight measured in insoluble products in heptane, and in an even more preferred way less than 0.3% by weight measured in insoluble products in pentane, and less than 0.05% by weight measured in insoluble products in heptane.

Said deasphalted hydrocarbon fraction DAO that is obtained from stage c) can next advantageously be subjected to an atmospheric distillation, optionally mixed with at least a portion of the light liquid fraction that boils at a temperature that is less than 300° C. and preferably all of said fraction, obtained from stage b) in such a way as to recover the different fractions of upgradable products, i.e., the gasoline fraction (150° C.–), the middle distillate fraction (150-375° C.), and a heavier hydroconverted feedstock fraction (375° C.+). This latter heavier fraction, optionally mixed with a feedstock that is external to the process, such as, for example, vacuum distillate fractions, atmospheric residue or vacuum residue obtained from the primary fractionation of the refinery, can advantageously be sent after fractionation or not into a section for hydrotreatment and/or catalytic cracking or catalytic hydrocracking, for example.

According to a preferred embodiment, the mixture that consists of at least a portion and preferably all of the light liquid fraction that boils at a temperature that is less than 300° C., preferably less than 350° C., and in a preferred manner less than 375° C., obtained from stage b) and said deasphalted hydrocarbon fraction DAO obtained from stage c) undergoes—preferably prior to the optional atmospheric distillation stage—a hydrotreatment stage and/or a hydrocracking stage in a fixed bed, in such a way as to upgrade the different hydrocarbon fractions that are produced and preferably the gasoline and middle distillate fractions and to improve their product qualities.

The optional stage of hydrotreatment and/or hydrocracking in a fixed bed can advantageously take place in one or more reactors or in a single reactor that comprises one or more catalytic beds.

The fixed-bed hydrocracking of the mixture that consists of at least a portion and preferably all of the light liquid fraction that boils at a temperature that is less than 300° C., preferably greater than 350° C., and in a preferred manner greater than 375° C., obtained from stage b) and from said deasphalted hydrocarbon fraction, uses an acidic catalysis in the presence of hydrogen, advantageously making it possible to convert said mixture that does not contain—or contains very few—C7 asphaltenes and no—or very few—metals.

The presence of nitrogen and other impurities in said mixture preferably requires a pretreatment prior to the acid catalysis for preventing the deactivation of the catalyst.

In the fixed-bed processes, preferably at least one fixed bed of supported catalyst is used for hydrotreatment and/or hydrocracking. These catalysts are known to one skilled in the art.

The procedure is preferably performed under an absolute pressure of between 5 and 35 MPa and in a preferred manner between 10 and 20 MPa, at a temperature that is advantageously between 300 and 500° C. and preferably between 350 and 450° C. The VVH and the partial pressure of hydrogen are selected based on the characteristics of the feedstock to be treated and the desired conversion. The VVH is preferably between 0.1 and 5 $h^{-1}$ and in a preferred manner between 0.15 and 2 $h^{-1}$. The quantity of hydrogen mixed with the feedstock is preferably between 100 and 1,000 normal cubic meters ($Nm^3$) per cubic meter ($m^3$) of liquid feedstock and in a preferred manner between 500 and 3,000 $Nm^3/m^3$.

The hydrotreatment and/or hydrocracking catalyst advantageously has a strong hydrogenating power so as to achieve a deep refining and to produce a significant reduction in the content of sulfur, Conradson carbon, and the content of C7 asphaltenes. It is preferably possible to use one of the catalysts described by the applicant in the patents EP-B-113297 and EP-B-113284.

In the case where the optional hydrotreatment and/or hydrocracking stage takes place in a single reactor comprising one or more beds and preferably several catalytic beds, it is advantageously possible to place a bed of a hydrotreatment and preferably hydrodesulfurization catalyst upstream (relative to the circulation of the feedstock) from the bed of a hydrocracking catalyst.

The hydrotreatment and/or hydrocracking catalysts that are used in the different catalytic beds can be identical or different.

In the case where the optional hydrotreatment and/or hydrocracking stage takes place in separate reactors and preferably in two reactors, it is advantageously possible to operate in the second reactor at a relatively low temperature, i.e., considerably lower than the temperature of the first hydrodesulfurization zone that tends to produce a deep hydrogenation and a limitation of the coking.

The hydrotreatment and/or hydrocracking catalysts that are used in the different reactors can be identical or different.

The purpose of the process according to the invention is therefore to propose a scheme in which the conversion is optimized by separating the residue in advance into different fractions, whereby these different fractions are next converted into the most suitable processes. The result is a substantial gain in performances, with the conversion being maximized and the yields and qualities of products in light fractions being enhanced. The process according to the invention thus makes it possible to realize savings in terms of initial investment, operating costs, and consumption of the aromatic fluxing agent that is necessary for conveying the asphalt phase.

BRIEF DESCRIPTION OF DRAWING

FIG. 1 illustrates the invention in a preferred embodiment.

The feedstock that consists of a crude oil or a hydrocarbon fraction that is obtained from atmospheric or vacuum distillation of a crude oil and that has an initial boiling point of at least 300° C. is sent via the pipe (1) into a hydroconversion unit (2) that operates in a boiling bed.

The effluent that is obtained at the end of the hydroconversion stage (exiting via the pipe 3) is separated in the separation zone (4). In the separation zone (4), the conditions are generally selected in such a way that the fraction point is 300° C., preferably 350° C., and in a preferred manner 375° C., in such a way as to obtain, without an atmospheric distillation stage and under intermediate vacuum, a heavy liquid fraction that boils at a temperature that is greater than 375° C. via the pipe (6) and a light fraction via the pipe (18), whereby said light fraction is separated from the light gases ($H_2$ and $C_1$-$C_4$) by being run into a separator (17) that makes it possible to recover the hydrogen that is recycled in the hydroconversion stage a) via the pipe (19) and a light liquid fraction that boils at a temperature that is less than 375° C. via the pipe (5).

The heavy liquid fraction is next sent via the pipe (6) into a deasphalting unit (7) for obtaining a deasphalted hydrocarbon fraction (DAO) via the pipe (8) and the residual asphalt via the pipe (9).

The deasphalted hydrocarbon fraction (DAO) is next mixed with the entire light liquid fraction (pipe (5)) that is obtained from the separation zone (4) in the pipe (9), and the mixture is next sent successively into a hydrotreatment unit (10) and then into a hydrocracking unit (11). The effluent that is obtained from the hydrocracking unit is next sent into an atmospheric distillation column (12) in such a way as to recover the different fractions that can be upgraded. The gasoline fraction is recovered via the pipe (13), the middle distillate fraction via the pipe (14), and a heavier hydroconverted feedstock fraction via the pipe (15).

The following examples illustrate the invention without limiting its scope.

EXAMPLES

Comparison Example

A residue (RA) resulting from the atmospheric distillation of an Athabasca crude is vacuum distilled under conditions that make it possible to obtain a vacuum residue called "Straight Run," according to English terminology (RSV SR), whose primary characteristics are presented in Table 1 below. The feedstock is therefore a vacuum residue of extra-heavy crude (RSV SR) whose properties are as follows:

TABLE 1

Composition of the Feedstock of the Boiling Bed Hydroconversion Unit

|  |  | Athabasca RSV SR |
|---|---|---|
| Density |  | 1.048 |
| Viscosity at 100° C. | cSt | 12,600 |
| Conradson Carbon | % by Weight | 20.5 |
| C7 Asphaltenes | % by Weight | 14 |
| C5 Asphaltenes | % by Weight | 25 |
| Nickel + Vanadium | ppm | 432 |
| Nitrogen | ppm | 6,200 |
| Sulfur | % by Weight | 5.72 |

The feedstock above is sent completely into a hydroconversion unit in the presence of hydrogen, whereby said section comprises at least one three-phase reactor that contains an NiMo/alumina hydroconversion catalyst that has an NiO content of 4.5% by weight and an MoO3 content of 10% by weight, whereby the percentages are expressed relative to the total mass of the catalyst. The section operates as a boiling bed operating in upward flow of liquid and gas. The unit comprises two reactors in series and is equipped with an inter-stage separator.

The conditions that are applied in the hydroconversion unit are as follows:

$VVH_{reactor}$=0.3 h$^{-1}$ $P_{tot}$=16 MPa

T=410° C.

Quantity of hydrogen mixed with the feedstock in the first reactor=630 Nm$^3$/m$^3$ Quantity of hydrogen mixed with the feedstock in the second reactor=190 Nm$^3$/m$^3$ These operating conditions make it possible to obtain a liquid effluent with a reduced content of Conradson carbon, metals and sulfur. The hydroconverted liquid effluent is next sent into an atmospheric and intermediate vacuum distillation zone following which a vacuum distillate fraction is recovered that boils at a temperature that is between 375 and 524° C. (DSV LB) and a vacuum residue fraction that boils at a temperature that is greater than 524° C. (RSV LB) whose yields and qualities of products are provided in Table 2 below.

TABLE 2

Yields and Qualities of Products of Heavy Products Originating from the Boiling Bed

|  |  | DSV LB (375-524° C.) | RSV LB (524° C.+) |
|---|---|---|---|
| Yield | % by Weight | 29.4 | 32.0 |
| Density |  | 0.969 | 1.029 |
| Viscosity at 100° C. | cSt | 14.1 | 2,800 |
| Conradson Carbon | % by Weight | 0.8 | 17.9 |
| C7 Asphaltenes | % by Weight | <500 ppm | 6.5 |
| Nickel + Vanadium | ppm | 4 | 119 |
| Nitrogen | ppm | 4,600 | 7,300 |
| Sulfur | % by Weight | 0.63 | 1.49 |

The vacuum residue (RSV LB) that is obtained from the distillation zone is next advantageously sent into a deasphalting section in which it is treated in an extractor using the butane solvent under deasphalting conditions that are known to one skilled in the art, making it possible to obtain a deasphalted hydrocarbon fraction, called DAO, and residual asphalt.

The conditions that are applied in the deasphalting unit are as follows:

Solvent: butane $P_{tot}$=3 MPa $T_{mean}$=95° C.

Solvent/feedstock ratio=8 v/v

At the output of the deasphalting, a deasphalted hydrocarbon fraction (DAO) and an asphalt are obtained. The deasphalted hydrocarbon fraction (DAO) and the asphalt have the following characteristics:

TABLE 3

Composition of DAO and the Asphalt

|  |  | DAO | Asphalt |
|---|---|---|---|
| Yield | % by Weight | 49.1 | 50.9 |
| Density |  | 0.993 | 1.066 |
| Ball & Ring | ° C. | — | 181 |
| Viscosity at 250° C. | cSt | — | 17,500 |
| Viscosity at 100° C. | cSt | 220 | — |
| Conradson Carbon | % by Weight | 4.7 | 30.6 |
| C7 Asphaltenes | % by Weight | 0.08 | — |
| Nickel + Vanadium | ppm | 2 | 232 |
| Nitrogen | ppm | 4,200 | 10,300 |
| Sulfur | % by Weight | 1.20 | 1.77 |

The DAO yield that is obtained is therefore low (less than 50%). In addition, so as to be able to transport the asphalt, it is necessary to reduce significantly the viscosity of this fraction. To do this, an aromatic fraction called a fluxing agent is generally added. Among the fluxing agents, the diesel fuel fraction LCO obtained from a catalytic cracking unit is the most used. So as to reduce the viscosity of the asphalt at 250° C. to 300 cSt, it is necessary to add 17% by mass of LCO relative to the asphalt, which represents 2.9% by mass of LCO relative to the initial RSV SR Athabasca.

The deasphalted hydrocarbon fraction (DAO) that is obtained is next mixed with the entire vacuum distillate, called DSV LB, obtained from the intermediate distillation stage. The mixture of the DAO fraction with the entire DSV LB fraction represents a purified fraction with an overall yield of 45.1% by weight relative to the initial Athabasca vacuum residue that has the following properties:

TABLE 4

Composition of the DSV LB + DAO Mixture

|  |  | DSV LB + DAO (375° C.+) |
| --- | --- | --- |
| Overall Yield | % | 45.1 |
| Density |  | 0.977 |
| Viscosity at 100° C. | cSt | 30.2 |
| Conradson Carbon | % by Weight | 2.2 |
| C7 Asphaltenes | % by Weight | 0.05 |
| Nickel + Vanadium | ppm | 3 |
| Nitrogen | ppm | 4,500 |
| Sulfur | % by Weight | 0.83 |

This mixture can next be sent to a post-treatment unit, such as a catalytic cracking unit or a hydrocracking unit. The mixture that is obtained can next undergo a hydrotreatment stage followed by a fixed bed hydrocracking stage under conditions that make it possible to reduce in particular its content of metals, sulfur and Conradson carbon and to obtain—after a new separation by atmospheric distillation—a gaseous fraction, an atmospheric distillate that can be split into a gasoline fraction and a diesel fuel fraction and a heavier fraction called atmospheric residue.

Example According to the Invention

The feedstock that is obtained and described in the preceding example is sent in its entirety into a hydroconversion unit in the presence of hydrogen, whereby said section comprises at least one three-phase reactor that contains an NiMo/alumina hydroconversion catalyst that has an NiO content of 4.5% by weight and an $MoO_3$ content of 10% by weight, whereby the percentages are expressed relative to the total mass of the catalyst. The section operates in a boiling bed with an upward flow of liquid and gas. The unit comprises two reactors in a series and is equipped with an inter-stage separator.

The conditions that are applied in the hydroconversion unit are as follows:

$VVH_{reactor}$=0.3 h$^{-1}$ $P_{tot}$=16 MPa

T=410° C.

Quantity of hydrogen mixed with the feedstock in the first reactor=630 Nm3/m3

Quantity of hydrogen mixed with the feedstock in the second reactor=190 Nm3/m3

These operating conditions make it possible to obtain a liquid effluent with a reduced content of Conradson carbon, metals and sulfur. The hydroconverted liquid effluent is next sent into a separation zone that consists of two flash tanks in a series for obtaining a light liquid fraction that boils at a temperature that is less than 375° C., and a heavy liquid fraction that boils at a temperature that is greater than 375° C.

The heavy fraction that boils at a temperature that is greater than 375° C. contains a portion of the diesel fuel fraction that boils between 250 and 375° C., a fraction that boils between 375 and 524° C. that is called vacuum distillate (DSV), and a fraction that boils at a temperature that is greater than 524° C. that is called a non-converted vacuum residue (RSV). The composition of the heavy fraction that boils at a temperature that is greater than 375° C. is described in Table 5 below.

TABLE 5

Composition of the Heavy Fraction that Boils at a Temperature that is Greater than 375° C.

|  |  | Heavy Fraction (375° C.+) |
| --- | --- | --- |
| Yield | % by Weight | 63.1 |
| Density |  | 0.996 |
| Viscosity at 100° C. | cSt | 92.3 |
| Conradson Carbon | % by Weight | 9.4 |
| C7 Asphaltenes | % by Weight | 3.3 |
| Nickel + Vanadium | ppm | 62 |
| Nitrogen | ppm | 5,900 |
| Sulfur | % by Weight | 1.06 |

The entire heavy liquid fraction that boils at a temperature that is greater than 375° C. that is obtained from the separation stage is deasphalted, without an atmospheric distillation stage and under intermediate vacuum, to obtain a deasphalted hydrocarbon fraction and residual asphalt. Since this fraction is much lighter than the RSV that is conventionally obtained, deasphalting can be done by using a heavier solvent and by toughening the operating conditions.

The conditions applied in the deasphalting unit are as follows:

Solvent: n-pentane $P_{tot}$=3 MPa $T_{mean}$=160° C.

Solvent/feedstock ratio=6 v/v

At the output of the deasphalting, a deasphalted hydrocarbon fraction (DAO) and an asphalt are obtained. The deasphalted hydrocarbon fraction (DAO) and the asphalt have the following characteristics:

TABLE 6

Composition of DAO and Asphalt

|  |  | DAO | Asphalt |
| --- | --- | --- | --- |
| Yield | % by Weight | 81.6 | 18.4 |
| Density |  | 0.977 | 1.091 |
| Ball & Ring | ° C. | — | 179 |
| Viscosity at 250° C. | cSt | — | 14,900 |
| Viscosity at 100° C. | cSt | 30.9 | — |
| Conradson Carbon | % by Weight | 3.8 | 34.5 |
| C7 Asphaltenes | % by Weight | 0.10 | — |
| Nickel + Vanadium | ppm | 4 | 315 |
| Nitrogen | ppm | 4,100 | 13,800 |
| Sulfur | % by Weight | 0.95 | 1.54 |

The DAO yield that is obtained is therefore high: 81.6%. So as to be able to transport the asphalt, it is necessary to reduce very significantly the viscosity of this fraction. So as to reduce the viscosity of the asphalt at 250° C. to 300 cSt, it is necessary to add 17% by mass of LCO relative to the asphalt, which, in the process according to the invention, represents only 2.0% by weight of LCO relative to the initial RSV SR Athabasca.

The thus obtained deasphalted hydrocarbon fraction (DAO) represents a purified fraction with an overall yield of 51.5% by weight relative to the initial Athabasca vacuum residue. This fraction can next be sent to a post-treatment unit, such as a catalytic cracking unit or a hydrocracking unit. The deasphalted oil that is obtained next can undergo a hydrotreatment stage followed by a hydrocracking stage in a fixed bed under conditions that make it possible to reduce in particular its content of metals, sulfur and Conradson carbon and to obtain—after a new separation by atmospheric distillation—a gaseous fraction, an atmospheric distillate that it is possible to split into a gasoline fraction and a diesel fuel fraction and a heavier fraction called an atmospheric residue.

The advantages of the process according to the invention are therefore multiple: first of all, the process of the invention prepares a larger quantity of a heavy fraction that can next be treated by a post-treatment process of hydrotreatment and/or hydrocracking type in a fixed bed and/or of catalytic cracking type. Actually, relative to a conventional concatenation of a boiling bed hydroconversion unit with a deasphalting unit, the yield of this heavy fraction that is produced is 51.5% by weight relative to the initial Athabasca vacuum residue instead of 45.1% by weight relative to the initial Athabasca vacuum residue, or a relative increase of 14%. The qualities of this heavy fraction that is produced are very similar to those obtained by the mixing of VGO and DAO in the conventional concatenation. Actually, the same density, viscosity, and content of metals, with a content of sulfur, Conradson carbon and C7 asphaltenes slightly down, are obtained, but there is a lower content of nitrogen, the latter being a significant value and restrictive for the post-treatment processes downstream, such as fixed-bed hydrocracking and catalytic cracking. Secondly, the initial investment is also reduced since the intermediate atmospheric distillation stage and the intermediate vacuum distillation stage that are implemented between these two units have been replaced by less sophisticated unit operations, leading to a reduction in the number of pieces of equipment. Thermal integration can also be enhanced by optimizing the exchanger network. Finally, the operating cost of the process has also been reduced in terms of consumption of the fluxing agent that is necessary for the transport of the asphalt. Actually, in the example according to the invention, only 2.0% by mass of LCO relative to the initial RSV Athabasca is necessary instead of 2.9% by mass of LCO relative to the initial RSV Athabasca in the case of the conventional concatenation, or a reduction of 30% in the consumption of the fluxing agent.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application Ser. No. 10/03560, filed Sep. 7, 2010, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for conversion of a feedstock comprising crude oil or of a heavy hydrocarbon fraction that is obtained from atmospheric or vacuum distillation of a crude oil and that has an initial boiling point of at least 300° C., said process comprising:

a) hydroconverting of at least one portion of said feedstock in the presence of hydrogen in at least one three-phase reactor, whereby said reactor contains at least one hydroconversion catalyst and operates in a boiling bed, with an upward flow of liquid and gas, and comprises at least one line capable of drawing off said catalyst outside of said reactor and at least one fresh catalyst make-up line in said reactor, under conditions that make it possible to obtain a liquid feedstock with a reduced content of Conradson carbon, metals, sulfur and nitrogen,
   b) separating of effluent that is obtained from a) obtaining a light liquid fraction that boils at a temperature that is less than 300° C. and a heavy liquid fraction that boils at a temperature that is greater than 300° C.,
   c) deasphalting of at least one portion of the heavy liquid fraction that boils at a temperature that is greater than 300° C. obtained from b) obtaining a deasphalted hydrocarbon fraction and residual asphalt, said process being conducted without an intermediate atmospheric or vacuum distillation stage.

2. The process according to claim 1, in which said feedstock consists of hydrocarbon fractions that have a sulfur content of at least 0.5% by weight, a Conradson carbon content of at least 5% by weight, a C7 asphaltene content of at least 1% by weight, and a metal content of at least 20 ppm.

3. The process according to claim 1, in which the hydroconversion a) operates under an absolute pressure of between 2 and 35 MPa, at a temperature that is between 300 and 550° C., at an hourly volumetric flow rate (VVH) of between 0.1 $h^{-1}$ and 10 $h^{-1}$, and—under a quantity of hydrogen that is mixed with the feedstock—is between 50 and 5,000 normal cubic meters ($Nm^3$) per cubic meter ($m^3$) of liquid feedstock.

4. The process according to claim 1, in which the hydroconversion catalyst is a catalyst that comprises an alumina substrate and at least one metal of group VIII that is nickel or cobalt, whereby said metal of group VIII is used in combination with at least one metal of group VIB that is molybdenum or tungsten.

5. The process according to claim 1, in which effluent that is obtained from a) undergoes a separation b) obtaining a light liquid fraction that boils at a temperature that is less than 350° C. and a heavy liquid fraction that boils at a temperature that is greater than 350° C.

6. The process according to claim 5, in which effluent that is obtained from a) undergoes a separation obtaining a light liquid fraction that boils at a temperature that is less than 375° C. and a heavy liquid fraction that boils at a temperature that is greater than 375° C.

7. The process according to claim 1, in which the separation b) is implemented by one or more flash tanks in a series.

8. The process according to claim 7, in which a concatenation of two successive flash tanks is implemented by the separation b).

9. The process according to claim 1, in which a mixture of at least one portion of the light liquid fraction that boils at a temperature that is less than 300° C., obtained from b), and of said deasphalted hydrocarbon fraction that is obtained from c), undergoes hydrotreatment and/or hydrocracking in a fixed bed.

10. The process according to claim 1, wherein a, b and c are conducted in the same unit reaction section.

* * * * *